US012696122B2

(12) United States Patent
Kasi et al.

(10) Patent No.: US 12,696,122 B2
(45) Date of Patent: Jul. 28, 2026

(54) SPATIAL DOMAIN BASIS SELECTION FROM AN EXTENDED ORTHOGONAL SET

(71) Applicant: QUALCOMM Incorporated, San Diego, CA (US)

(72) Inventors: Shahrukh Khan Kasi, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 18/630,887

(22) Filed: Apr. 9, 2024

(65) Prior Publication Data

US 2025/0317773 A1 Oct. 9, 2025

(51) Int. Cl.
*H04W 24/10* (2009.01)
*H04B 7/0417* (2017.01)
*H04B 7/06* (2006.01)

(52) U.S. Cl.
CPC .......... *H04W 24/10* (2013.01); *H04B 7/0417* (2013.01); *H04B 7/0626* (2013.01)

(58) Field of Classification Search
None
See application file for complete search history.

(56) References Cited

U.S. PATENT DOCUMENTS

| | | | |
|---|---|---|---|
| 2023/0291453 A1 | 9/2023 | Chou et al. | |
| 2025/0132790 A1* | 4/2025 | Fan ...................... | H04B 7/0417 |
| 2026/0058700 A1* | 2/2026 | Ren ...................... | H04B 7/0456 |

FOREIGN PATENT DOCUMENTS

WO WO-2024036212 A1 2/2024

OTHER PUBLICATIONS

International Search Report and Written Opinion—PCT/US2025/019606—ISA/EPO—Jun. 10, 2025.

* cited by examiner

*Primary Examiner* — Walter J Divito
(74) *Attorney, Agent, or Firm* — Holland & Hart LLP/Qualcomm Incorporated

(57) ABSTRACT

Methods, systems, and devices for wireless communications at a user equipment (UE) are described. The UE may receive one or more reference signals. The UE may select, from among a set of spatial domain (SD) bases, a first SD basis. The UE may select, from among a subset of the set of SD bases, a second SD basis, where the subset of the set of SD bases comprises a first group and a second group, where each SD basis of the first group is orthogonal to the first SD basis in one dimension, and where each SD basis of the second group is orthogonal to the first SD basis in two dimensions. The UE may transmit a report indicative of the first SD basis and the second SD basis.

20 Claims, 9 Drawing Sheets

First SD Basis 320

First Group 325

Second Group 330

510

520

515

505

500

| Reference Signal Component | SD Basis Selection Component |
| :---: | :---: |
| 725 | 730 |
| Report Component | Offset Component |
| 735 | 740 |

720

700

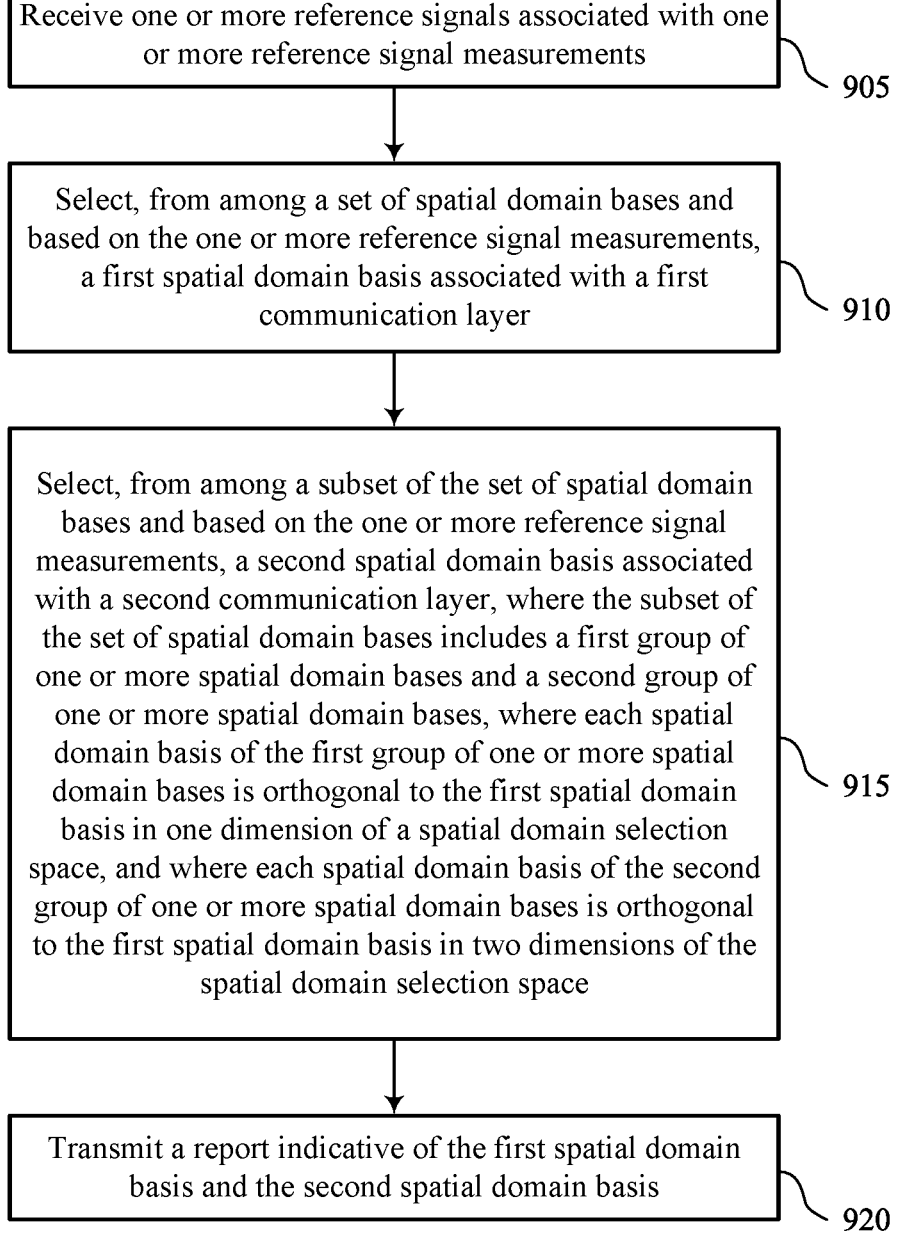

Receive one or more reference signals associated with one or more reference signal measurements ⟍ 905

Select, from among a set of spatial domain bases and based on the one or more reference signal measurements, a first spatial domain basis associated with a first communication layer ⟍ 910

Select, from among a subset of the set of spatial domain bases and based on the one or more reference signal measurements, a second spatial domain basis associated with a second communication layer, where the subset of the set of spatial domain bases includes a first group of one or more spatial domain bases and a second group of one or more spatial domain bases, where each spatial domain basis of the first group of one or more spatial domain bases is orthogonal to the first spatial domain basis in one dimension of a spatial domain selection space, and where each spatial domain basis of the second group of one or more spatial domain bases is orthogonal to the first spatial domain basis in two dimensions of the spatial domain selection space ⟍ 915

Transmit a report indicative of the first spatial domain basis and the second spatial domain basis ⟍ 920

SPATIAL DOMAIN BASIS SELECTION FROM AN EXTENDED ORTHOGONAL SET

FIELD OF TECHNOLOGY

The following relates to wireless communications at a user equipment (UE), including spatial domain basis selection from an extended orthogonal set.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may communicate in accordance with one or more spatial domain (SD) bases. However, such approaches may be improved.

SUMMARY

The described techniques relate to improved methods, systems, devices, and apparatuses that support spatial domain (SD) basis selection from an extended orthogonal set. For example, a user equipment (UE) may receive one or more reference signals associated with one or more reference signal measurements. The UE may select, from among a set of SD bases and based at least in part on the one or more reference signal measurements, a first SD basis associated with a first communication layer. The UE may select, from among a subset of the set of SD bases and based at least in part on the one or more reference signal measurements, a second SD basis associated with a second communication layer, where the subset of the set of SD bases comprises a first group of one or more SD bases and a second group of one or more SD bases, where each SD basis of the first group of one or more SD bases is orthogonal to the first SD basis in one dimension of an SD basis selection space, and where each SD basis of the second group of one or more SD bases is orthogonal to the first SD basis in two dimensions of the SD basis selection space. The UE may transmit a report indicative of the first SD basis and the second SD basis.

A method for wireless communications by a UE is described. The method may include receiving one or more reference signals associated with one or more reference signal measurements, selecting, from among a set of SD bases and based on the one or more reference signal measurements, a first SD basis associated with a first communication layer, selecting, from among a subset of the set of SD bases and based on the one or more reference signal measurements, a second SD basis associated with a second communication layer, where the subset of the set of SD bases includes a first group of one or more SD bases and a second group of one or more SD bases, where each SD basis of the first group of one or more SD bases is orthogonal to the first SD basis in one dimension of a SD basis selection space, and where each SD basis of the second group of one or more SD bases is orthogonal to the first SD basis in two dimensions of the SD basis selection space, and transmitting a report indicative of the first SD basis and the second SD basis.

A UE for wireless communications is described. The UE may include one or more memories storing processor executable code, a transceiver, and one or more processors coupled with the one or more memories and the transceiver. The one or more processors may individually or collectively be operable to execute the code to cause the UE to receive, via the transceiver, one or more reference signals associated with one or more reference signal measurements, select, from among a set of SD bases and based on the one or more reference signal measurements, a first SD basis associated with a first communication layer, select, from among a subset of the set of SD bases and based on the one or more reference signal measurements, a second SD basis associated with a second communication layer, where the subset of the set of SD bases includes a first group of one or more SD bases and a second group of one or more SD bases, where each SD basis of the first group of one or more SD bases is orthogonal to the first SD basis in one dimension of a SD basis selection space, and where each SD basis of the second group of one or more SD bases is orthogonal to the first SD basis in two dimensions of the SD basis selection space, and transmit, via the transceiver, a report indicative of the first SD basis and the second SD basis.

Another UE for wireless communications is described. The UE may include means for receiving one or more reference signals associated with one or more reference signal measurements, means for selecting, from among a set of SD bases and based on the one or more reference signal measurements, a first SD basis associated with a first communication layer, means for selecting, from among a subset of the set of SD bases and based on the one or more reference signal measurements, a second SD basis associated with a second communication layer, where the subset of the set of SD bases includes a first group of one or more SD bases and a second group of one or more SD bases, where each SD basis of the first group of one or more SD bases is orthogonal to the first SD basis in one dimension of a SD basis selection space, and where each SD basis of the second group of one or more SD bases is orthogonal to the first SD basis in two dimensions of the SD basis selection space, and means for transmitting a report indicative of the first SD basis and the second SD basis.

A non-transitory computer-readable medium storing code for wireless communications is described. The code may include instructions executable by one or more processors to receive one or more reference signals associated with one or more reference signal measurements, select, from among a set of SD bases and based on the one or more reference signal measurements, a first SD basis associated with a first communication layer, select, from among a subset of the set of SD bases and based on the one or more reference signal measurements, a second SD basis associated with a second communication layer, where the subset of the set of SD bases includes a first group of one or more SD bases and a second group of one or more SD bases, where each SD basis of the first group of one or more SD bases is orthogonal to the first SD basis in one dimension of a SD basis selection space, and where each SD basis of the second group of one or more SD bases is orthogonal to the first SD basis in two dimensions of the SD basis selection space, and transmit a report indicative of the first SD basis and the second SD basis.

In some examples of the method, UEs, and non-transitory computer-readable medium described herein, the SD basis selection space may be a two-dimensional selection space with a first dimension associated with a first quantity of antenna ports and a second dimension associated with a second quantity of antenna ports and the first SD basis and the second SD basis may be selected from within the SD basis selection space.

In some examples of the method, UEs, and non-transitory computer-readable medium described herein, the set of SD bases includes a set of multiple SD bases determined based on an oversampling of the two-dimensional selection space.

In some examples of the method, UEs, and non-transitory computer-readable medium described herein, each SD basis of the first group of one or more SD bases may have zero offset, relative to the first SD basis, within one dimension of the SD basis selection space and each SD basis of the second group of one or more SD bases may have a first respective offset, relative to the first SD basis, within a first dimension of the SD basis selection space and a second respective offset, relative to the first SD basis, within a second dimension of the SD basis selection space, the first respective offset and the second respective offset based on respective integer multiples of an oversampling factor.

In some examples of the method, UEs, and non-transitory computer-readable medium described herein, the subset from among which the second SD basis may be selected excludes the first SD basis.

In some examples of the method, UEs, and non-transitory computer-readable medium described herein, the first SD basis and the second SD basis may be selected based on a comparison between a set of multiple SD basis combinations, where each SD basis combination of the set of multiple SD basis combinations includes a respective first candidate SD basis selected from among the set of SD bases and a respective second candidate SD basis selected from among a respective subset of the set of SD bases, the respective subset including a respective first group of one or more SD bases that may be orthogonal to the respective first candidate SD basis in one dimension of the SD basis selection space and a respective second group of one or more SD bases that may be orthogonal to the respective first candidate SD basis in two dimensions of the SD basis selection space.

In some examples of the method, UEs, and non-transitory computer-readable medium described herein, the second SD basis corresponds to an index associated with a first selection space offset and a second selection space offset that may be relative to the first SD basis and the first selection space offset, the second selection space offset, or both, may be based on a first dimension of the SD basis selection space, a second dimension of the SD basis selection space, a first oversampling factor associated with the first dimension, a second oversampling factor associated with the second dimension, or any combination thereof.

Some examples of the method, UEs, and non-transitory computer-readable medium described herein may further include operations, features, means, or instructions for selecting the first selection space offset and the second selection space offset from a first set of candidate selection space offsets or a second set of candidate selection space offsets based on a first value of the first dimension of the SD basis selection space, a second value of the second dimension of the SD basis selection space, or both, where the second set of candidate selection space offsets may be a subset of the first set of candidate selection space offsets.

In some examples of the method, UEs, and non-transitory computer-readable medium described herein, the report indicates the index.

Some examples of the method, UEs, and non-transitory computer-readable medium described herein may further include operations, features, means, or instructions for selecting the second SD basis from among the subset of the set of SD bases may be based on satisfaction of a selection condition that may be based on a rank criteria and a port quantity threshold.

In some examples of the method, UEs, and non-transitory computer-readable medium described herein, the rank criteria includes a rank of two, three, or four and the port quantity threshold may be greater than or equal to thirty-two (32).

In some examples of the method, UEs, and non-transitory computer-readable medium described herein, each SD basis within the set of SD bases corresponds to a respective beam for wireless communications.

BRIEF DESCRIPTION OF THE DRAWINGS

FIG. 9 shows a flowchart illustrating methods that support SD basis selection from an extended orthogonal set in accordance with one or more examples as disclosed herein.

DETAILED DESCRIPTION

Figure 1:
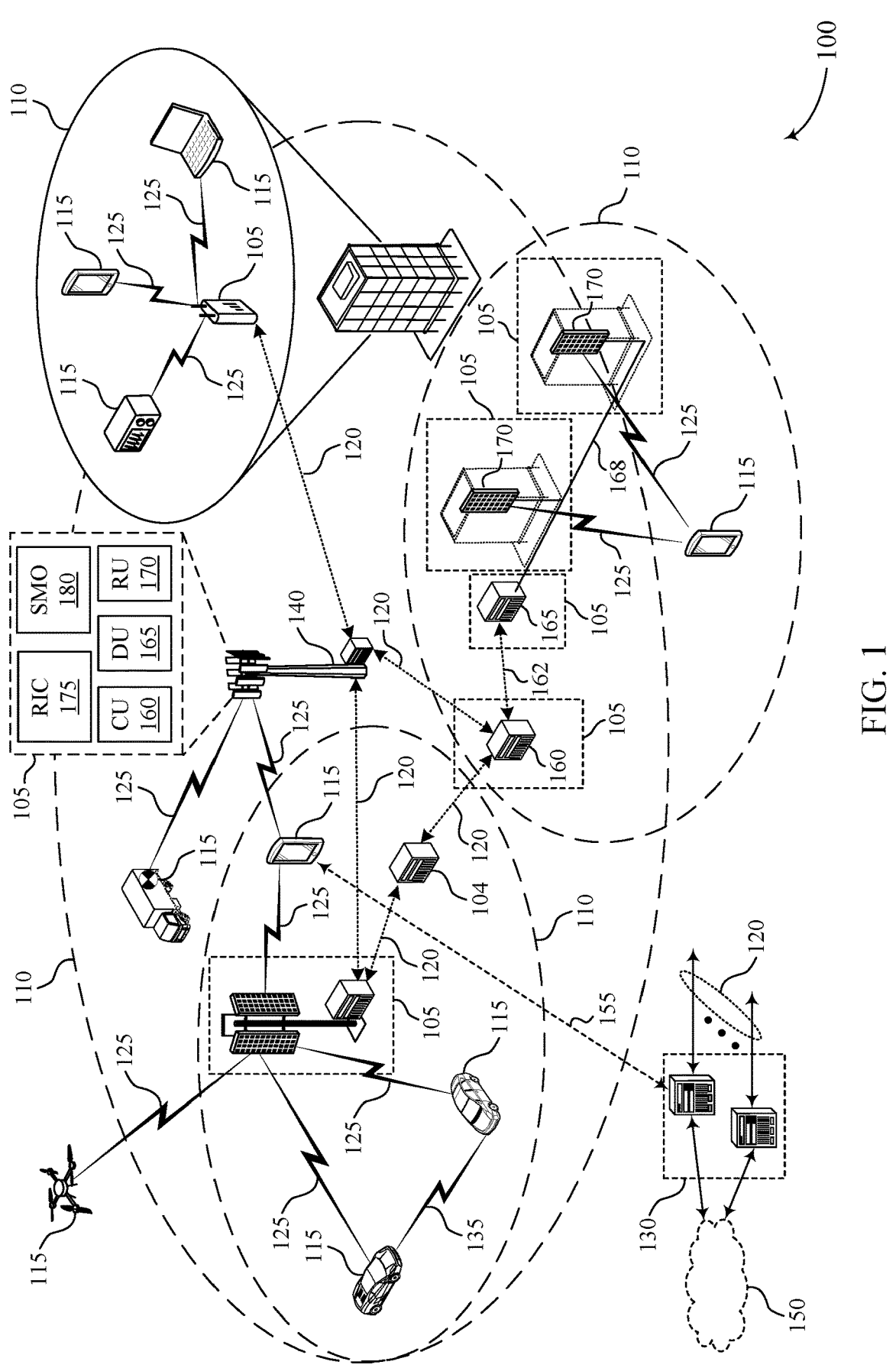
FIG. 1 shows an example of a wireless communications system that supports spatial domain (SD) basis selection from an extended orthogonal set in accordance with one or more examples as disclosed herein.

Wireless communication devices may communicate using a quantity of spatial domain (SD) bases, where a precoder for wireless transmissions may be based on one or more precoding matrices, and an SD basis may be a vector that constitutes a portion (e.g., a column) of a precoding matrix. Physically, an SD basis may correspond to a certain beam width and direction (e.g., a digital beam). Some precoders may be based on codebooks, and for some types of wireless communications systems, a codebook may be a Type-I codebook or another type of codebook (e.g., a Type-II codebook). For precoders based on a Type-I codebooks, a single selected SD basis may be used either for a single layer or for a pair of layers (e.g., a pair of layers with orthogonal co-phases). For precoders based on a Type-II codebook, a single selected SD basis may be used for any quantity of layers. Layers as used herein may refer to a quantity of communication layers (e.g., MIMO layers), which may also correspond to a quantity of layers for channel state information (CSI) reporting, a quantity of columns included in a precoding matrix, or any combination thereof. Some examples may be described herein with respect to the use of Type-I codebooks, but is to be understood that the teachings herein are not so limited and may be applied to SD basis selection generally.

Also, in wireless communications, channel state information (CSI) reference signal (CSI-RS) aggregation may be employed, in which CSI-RSs may be transmitted across multiple CSI-RS resources and may employ larger quantities of ports (e.g., greater than 32 ports). However, in some wireless communications systems, SD basis selection for Type-I codebooks may be limited. For example, when selecting multiple SD bases, some wireless communications systems may allow a very limited set of candidate SD bases when selecting a second SD basis for a second layer that is associated with a first selected SD basis for a first layer, where the first and second SD bases are orthogonal to one another.

Techniques described herein may provide for improved (e.g., more flexible) SD basis selection, among other possible benefits. For example, to select a first SD basis and a second SD basis that are orthogonal to one another, the UE may select the first SD basis from a set of possible SD bases (e.g., with no restriction). The UE may select the second SD basis from a subset of the set of possible SD bases that includes two groups of SD bases. A first group may include SD bases that are orthogonal to the first SD basis in one dimension of an SD basis search space. The second group may include SD bases that are orthogonal to the first SD basis in two dimensions of the SD basis search space. Such a selection and reporting thereof may be made with reference to a set of indices, where each index is associated with dimensional offsets relative to the first SD basis that indicate the second selected SD basis. By selecting orthogonal SD bases with more freedom, communications quality, throughput, resource utilization, flexibility, and reliability may be increased while reducing overhead and latency.

Aspects of the disclosure are initially described in the context of wireless communications systems. Aspects of the disclosure are then described with reference to a wireless communications system, a selection scheme, and a process flow. Aspects of the disclosure are further illustrated by and described with reference to apparatus diagrams, system diagrams, and flowcharts that relate to SD basis selection from an extended orthogonal set.

FIG. 1 shows an example of a wireless communications system 100 that supports SD basis selection from an extended orthogonal set in accordance with one or more examples as disclosed herein. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, a UE 115 and a network entity 105 may support SD basis selection from an extended set of possible SD bases. For example, the network entity 105 may transmit one or more reference signals to the UE 115. Based on measurements of these reference signals, the UE 115 may select a combination of a first SD basis and a second SD basis. The first SD basis may be selected from a set of possible SD bases and the second SD basis may be selected from a subset of possible SD bases that is based at least in part on the first SD basis. For example, the subset of SD bases may include two groups of SD bases, such as a first group of SD bases that are orthogonal to the first SD basis in one dimension of an SD basis selection space, and a second group of SD bases that are orthogonal to the first SD basis in two dimensions of the SD basis selection space. The UE may transmit an indication of the first SD basis, the second SD basis, or both to the network entity 105 to support further communications operations.

Figure 2:
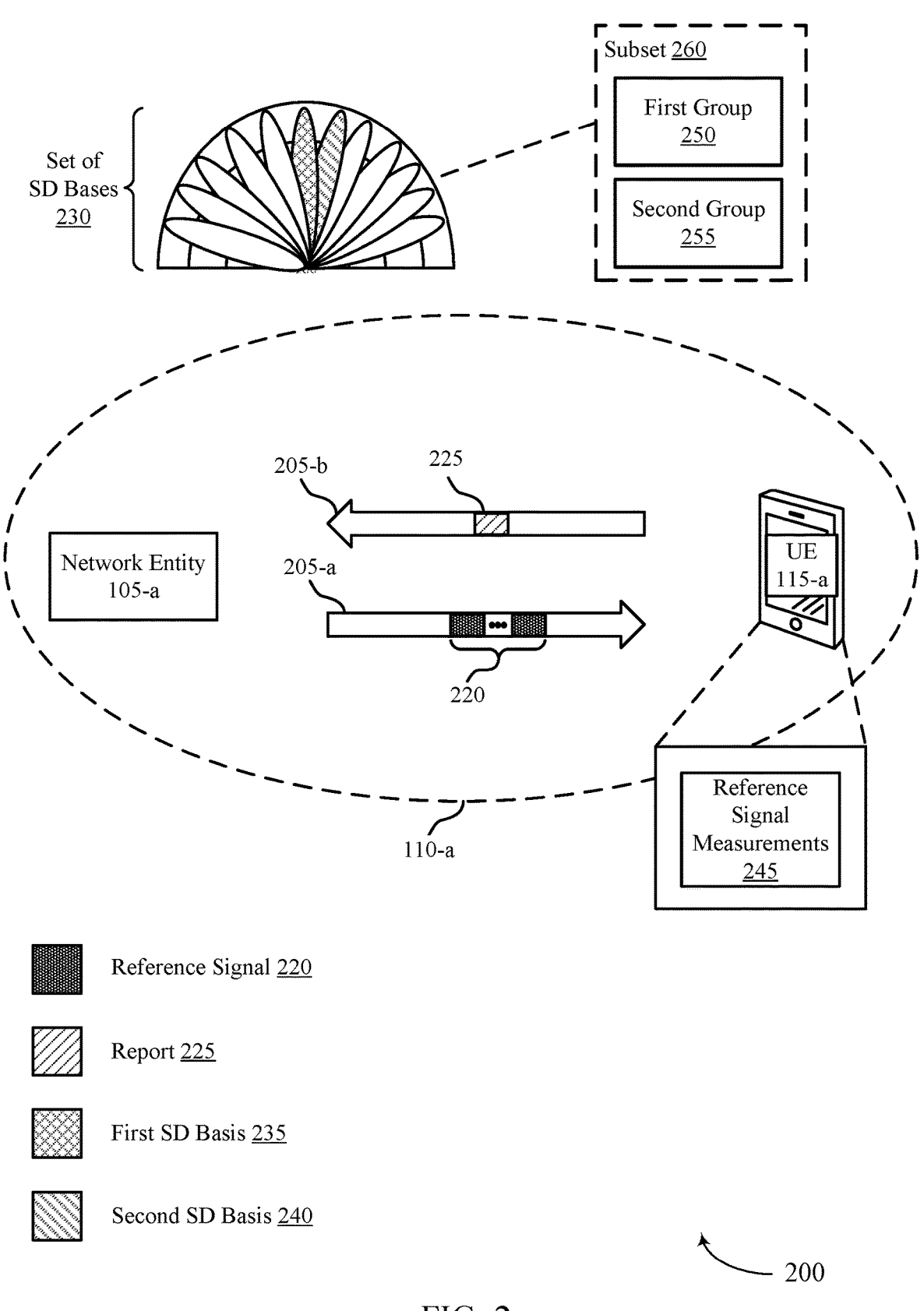
FIG. 2 shows an example of a wireless communications system that supports SD basis selection from an extended orthogonal set in accordance with one or more examples as disclosed herein.

FIG. 2 shows an example of a wireless communications system 200 that supports SD basis selection from an extended orthogonal set in accordance with one or more examples as disclosed herein. The wireless communications system 200 may include the network entity 105-a, which may be an example of one or more network entities discussed in relation to other figures. The wireless communications system 200 may include the UE 115-a, which may be an example of UEs discussed in relation to other figures.

In some examples, the UE 115-a may be located in a geographic coverage area 110-a that may be associated with the network entity 105-a. The network entity 105-a and UE 115-a may communicate via one or more downlink communication links 205-a and one or more uplink communication links 205-b.

Throughout this disclosure, beams and SD bases are both discussed. However, discussion of beams may be equally applied to SD bases and discussion of SD bases may be equally applied to beams. In some examples, an SD basis may be a vector of a precoding matrix which may correspond to a beam used for communications. Further, though examples of a Type-I codebook or other types of codebooks are discussed, the techniques described herein may be applied to any type of codebook, including, but not limited to, a Type I Codebook, a Type II Codebook, a Type II Port Selection Codebook, an Enhanced Type II Codebook, an Enhanced Type II Port Selection Codebook, a Further Enhanced Type II Port Selection Codebook, an Enhanced Type II Codebook for Predicted PMI, a Further Enhanced Type II Port Selection Codebook for Predicted PMI, an Enhanced Type II Codebook for Coherent Joint Transmission (CJT), a Further Enhanced Type II Port Selection Codebook for CJT, a Doppler Type-II Codebook, one or more other codebooks, or any combination thereof.

In some wireless communications scenarios, a wireless communications system (e.g., such as the wireless communications system 200) may support CSI information operations for greater quantities of ports than in other scenarios. For example, a wireless communications system may support CSI operations for up to 128 CSI-RS ports (e.g., which may be associated with a frequency range, such as FR1). In some examples, modifications or improvements involving codebook refinement (e.g., Type-I codebook refinement or modifications, Type-II codebook refinement or modifications, one or more other refinements or modifications, or any combination thereof) may support greater quantities of ports than other approaches (e.g., 128 CSI-RS ports across multiple resources). In some examples, one or more resources may each be individually associated with up to 32 ports per resource.

In some examples, new values of N1 and N2 are proposed, where the total quantity of CSI-RS ports across aggregated non-zero power (NZP) CSI-RS resources may be represented by 2N1N2 (e.g., where 2N1N2 is greater than or equal to 32). Additionally, or alternatively, the set of orthogonal beams for the selection of the second beam may be expanded based on a codebook, such as a type-I single-panel codebook. In some examples, a first selected beam may be referred to using (i1,1, i1,2). A second selected beam may be selected from the expanded set of orthogonal beams of size: $(N_1-1) N_2O_2+(N_2-1)N_1O_1-(N_1-1)(N_2-1)$. In some examples, one or more restrictions may be applied to the expanded orthogonal set of beams.

For example, in some cases, a quantity of CSI-RS ports across aggregated resources, N1 values, N2 values, or any combination thereof, may be employed as depicted in Table 1. Though some example values are included here, other values are possible and contemplated by the current disclosure.

TABLE 1

| Total Quantity of CSI-RS Ports Across Aggregated Resources (=P) | $(N_1, N_2)$ |
| --- | --- |
| 48 | (8, 3) |
| | (6, 4) |
| 64 | (16, 2) |
| | (8, 4) |
| 128 | (16, 4) |
| | (8, 8) |

In other approaches, a Type-I codebook may support up to 32 CSI-RS ports for up to 8 layers. However, in accordance with the techniques described herein, the Type I codebook may support up to 128 CSI-RS ports. Additionally, or alternatively, the techniques described herein may involve not only an increase to the quantity of ports but may also encompass refining the existing Type-I codebook for optimization. In some examples of Type-I CSI operations, the UE 115-a may select a Precoding Matrix Indicator (PMI) from a DFT-codebook. The quantity of available beams in this codebook may be determined by the quantity of CSI-RS ports and the degree of DFT oversampling. Specifically, the factors for determining the total quantity of beams in the codebook may be represented by N1, N2, O1, and O2. Here, N1 and N2 may denote the quantity of antenna ports for each polarization in horizontal and vertical dimensions, respectively (or vice versa), while O1 and O2 may represent the DFT beam oversampling factors in those same dimensions (or vice versa).

In some examples, a codebook (e.g., a type-I codebook) may be modified to accommodate different quantities of layers. For example, a codebook to be employed in two-layer situations may be expressed as $$W^{2-layer} = \frac{1}{\sqrt{2P_{CSIRS}}}\begin{bmatrix} b_1 & b_2 \\ cb_1 & -cb_2 \end{bmatrix},$$

a codebook to be employed in three-layer situations may be expressed as $$W^{3-layer} = \frac{1}{\sqrt{3P_{CSIRS}}}\begin{bmatrix} b_1 & b_2 & b_1 \\ cb_1 & cb_2 & -cb_1 \end{bmatrix},$$

and a codebook to be employed in four-layer situations may be expressed as $$W^{4-layer} = \frac{1}{\sqrt{4P_{CSIRS}}}\begin{bmatrix} b_1 & b_2 & b_1 & b_2 \\ cb_1 & cb_2 & -cb_1 & -cb_2 \end{bmatrix},$$

where W represents a codebook, $P_{CSIRS}$ is the quantity of CSI-RS ports, $b_1$ is the first selected beam, $b_2$ is the second selected beam, and c is the co-phase (e.g., which may be selected from values of 1, j, −1, −j, or other values). The co-phase value may correspond with or may indicate a polarization used in an antenna panel of the UE or other wireless device.

In some examples, the UE 115-*a* may receive one or more reference signals 220 and may measure the one or more reference signals 220 to produce one or more reference signal measurements 245. Based on the reference signal measurements 245, the UE 115-*a* may select the first SD basis 235 and the second SD basis 240 from the set of SD bases 230. The first SD basis 235 may be associated with a first communication layer and the second SD basis 240 may be associated with a second communication layer. In some examples, the UE 115-*a* may select the first SD basis 235 from the set of SD bases 230 and may select the second SD basis 240 from the subset 260 of the set of SD bases 230. The subset 260 of the set of SD bases 230 may include the first group 250 of one or more SD bases and the second group 255 of one or more SD bases. In some examples, each SD basis of the first group 250 may be orthogonal to the first SD basis 235 in one dimension of an SD basis selection space and each SD basis of the second group 255 orthogonal to the first SD basis 235 in two dimensions of the SD basis selection space. In this way, the UE 115-*a* may select the first SD basis 235 and the second SD basis 240 from an extended set of SD bases that is not available for selection in other approaches, while still maintaining orthogonality character-istics between the first SD basis 230 and the second SD basis 235. Having selected the first SD basis 235 and the second SD basis 240, the UE 115-*a* may transmit the report 225 which may indicate the first SD basis 235 and the second SD basis 240.

In some examples, the UE 115-*a* may select the first SD basis 235 and the second SD basis 240 by considering combinations of candidate first SD bases and candidate second SD bases in parallel (e.g., as opposed to selecting a first SD basis and a second SD basis sequentially, where selecting the second SD basis is based on the selection of the first SD basis). The UE 115-*a* may consider various com-binations or pairs of candidate first SD bases and candidate second SB bases, and in some examples, some such com-binations may have a common SD basis as the first SD basis or the second SD basis, or a first SD basis of a first combination may be the same SD basis as a second SD basis of a second combination (and vice versa).

Figure 3:
FIG. 3 shows an example of a selection scheme that supports SD basis selection from an extended orthogonal set in accordance with one or more examples as disclosed herein.
Figure 3:
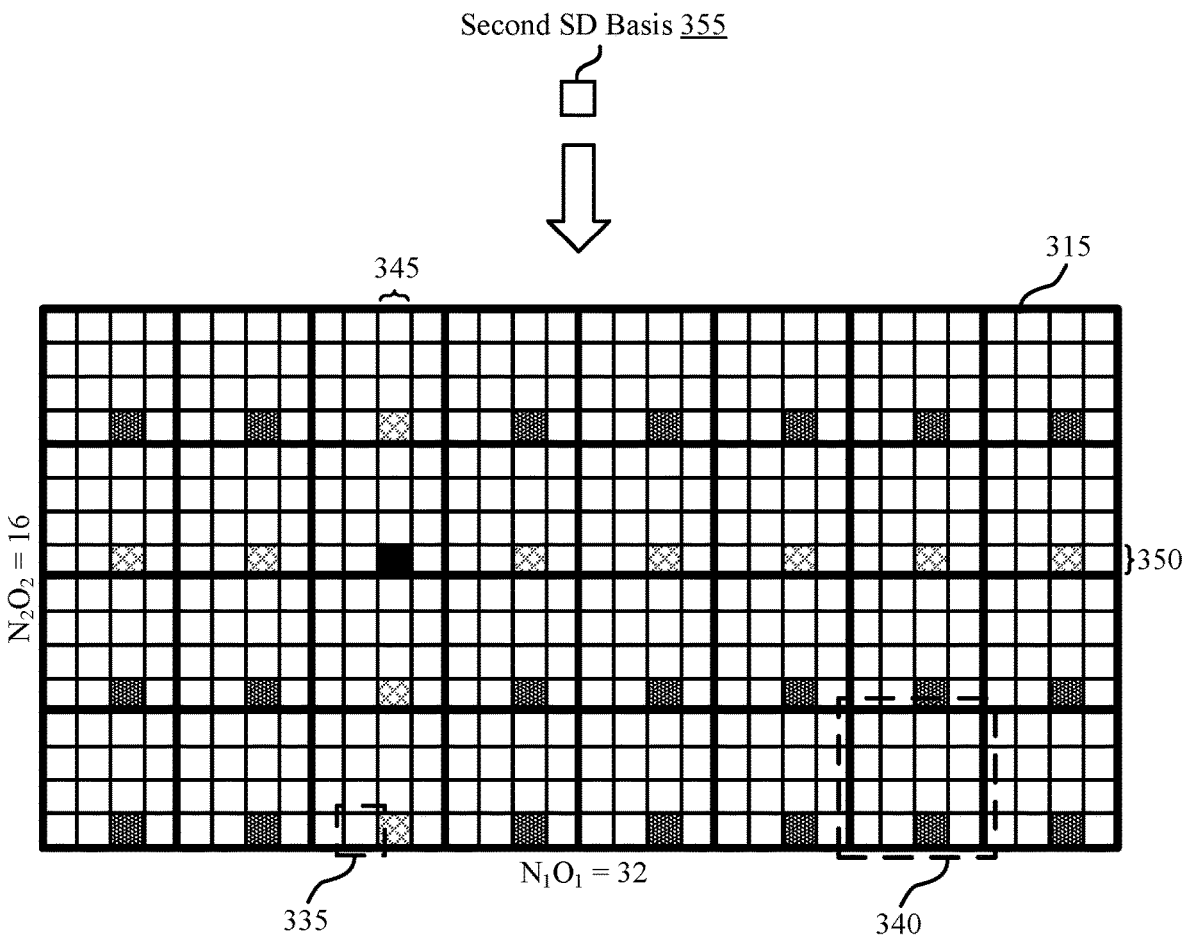
Figure 3:
Figure 3:
Figure 3:
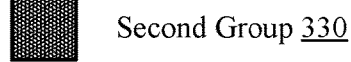
Figure 3:

FIG. 3 shows an example of a selection scheme 300 that supports SD basis selection from an extended orthogonal set in accordance with one or more examples as disclosed herein.

The selection scheme 300 may involve an SD basis grid 315 of a size that corresponds with the values of N1 and N2. For example, N1 may correspond with a quantity of divi-sions 340 in a horizontal direction (e.g., eight, as depicted in FIG. 3) and N2 may correspond with a quantity of divisions 340 in a vertical direction (e.g., four, as depicted in FIG. 3). The SD basis grid 315 may include a quantity of SD bases 335 that correspond with N1O1 in the horizontal direction and N2O2 in the vertical direction, where O1 is an over-sampling factor for the horizontal direction and O2 is an oversampling factor for the vertical direction. The use of the oversampling factors may create additional divisions within the divisions 340. For example, as shown in FIG. 3, O1 is four and O2 is also four, resulting in a four-by-four grid of SD bases 335 within each division 340 in the SD basis grid 315. For example, as shown in FIG. 3, N1 is eight and O1 is four, resulting in thirty-two SD bases 335 in the horizontal direction. Similarly, N2 is four and O2 is four, resulting in sixteen SD bases 335 in the vertical direction. Thus, the SD basis grid 315 includes a total of five hundred twelve SD bases 335. These five hundred twelve SD bases 335 may correspond with the first group 250 of the set of SD bases 230. Further, a quantity of ports for the selection scheme 300 may be expressed by $2N_1N_2$, which, in this case, is equal to sixty-four.

In some examples, any SD basis 335 of the SD basis grid 315 may be selected as the first SD basis 320. In the example of FIG. 3, the first SD basis 320 is selected and corresponds to the column 345 and the row 350 of the SD basis grid 315. In other approaches, the second SD basis 355 is only selectable from a limited quantity of the SD bases 335 of the SD basis grid 315. For example, given the first SD basis 320, some other approaches only allowed the second SD basis 355 to be selected from the following: the first SD basis 320 (e.g., the same SD basis is used for the first SD basis 320 and the second SD basis 355), an SD basis with a horizontal positive offset value corresponding to O1, an SD basis with a horizontal positive offset value corresponding to 2*O1, and an SD basis with a vertical positive offset value corre-sponding to O2.

However, the techniques described herein allow the sec-ond SD basis 355 to be selected from the first group 325 and the second group 330. The first group 325 and the second group 330 are included in a subset (e.g., the subset 260) of the complete set of SD bases (e.g., the set of SD bases 230 or the complete collection of all SD bases 335 included in the SD basis grid 315).

In some examples, it may be desirable for a transmission associated with the first SD basis 320 and the second SD basis 355 to be orthogonal to one another. Such orthogo-nality may not refer to orthogonal physical directions of beams associated with the SD bases, but rather that the information transmitted on the respective beams are orthogonal to one another and will not interference with one another. Further, though a first layer associated with the first SD basis 320 and a second layer associated with the second SD basis 355 may not be inherently orthogonal to one another, in situations in which information associated with the respective layers is transmitted using orthogonal beams associated with the respective SD bases, the information of each layer is effectively orthogonal to the information of the other layers.

In some examples, SD bases 335 that share a column may not be orthogonal to each other in the horizontal direction or dimension (though they may be orthogonal to one another in the vertical direction or dimension) and SD bases 335 that share a row may not be orthogonal to each other in the vertical direction (though they may be orthogonal to one another in the horizontal direction or dimension). Two SD bases 335 that share neither a column nor a row may be orthogonal to one another in two directions or dimensions.

As shown in FIG. 3, the SD bases 335 from which the second SD basis 355 may be selected are orthogonal to the first SD basis 320 in at least one dimension or direction. For example, the first group 325 may include those SD bases 335 that share either a column or a row of the SD basis grid 315 with the first SD basis 320 and are therefore orthogonal to the first SD basis 230 in only one direction or dimension (be it a vertical direction or dimension or a horizontal direction or dimension). The second group 330 may include those SD bases 335 that do not share a column nor a row of the SD basis grid 315 with the first SD basis 320 and are therefore orthogonal to the first SD basis 230 in two directions or dimensions (e.g., both the vertical direction or dimension and the horizontal direction or dimension). In some examples, the first SD basis 320 may be excluded or otherwise not included in the first group 325 and the second group 330, thereby eliminating a possibility of repeating the same SD basis as both the first SD basis 320 and the second SD basis 355. Thus, the possible "pool" of SD bases 335 from which the second SD basis 355 may be selected is expanded and greater than the "pool" of SD bases previously available in association with other approaches, while maintaining orthogonality between the first SD basis 320 and the second SD basis 355.

In some examples, the selection scheme 300 for selecting the second SD basis 355 may be available in situations in which rank and a quantity of ports both meet respective thresholds or criteria. For example, the selection scheme 300 may be available in situations in which a rank for wireless communications is two, three, or four and a total quantity of ports is greater than or equal to thirty-two ports.

In some examples, a table may be used to associated one or more offsets (relative to the first SD basis 320) that are used to indicate which SD basis 335 is to be selected as the second SD basis 355 from the SD basis grid 315. For example, such a table may map $k_1$ and $k_2$ values corresponding to offsets in the horizontal and vertical directions or dimensions respectively. Further, different combinations of $k_1$ and $k_2$ may each be associated with a respective index to facilitate indication of the selected second SD basis 355. Such an updated table may be used not only for two-layer reporting, but also for three-layer reporting, four-layer reporting, or for reporting associated with other quantities of layers. In comparison to tables and reporting schemes used in other approaches, an increase in feedback overhead may be a $\lceil \log_2(N_1N_2-1) \rceil$ quantity of bits. An example of such a table associated with the selection scheme 300 is shown herein in Table 2.

TABLE 2

| $i_{1,3}$ | $N_1 > N_2 > 1, N_1 = N_2$ | | $N_1 > N_2, N_1 = 1$ | |
|---|---|---|---|---|
| | $k_1$ | $k_2$ | $k_1$ | $k_2$ |
| 0 | $O_1$ | 0 | $O_1$ | 0 |
| 1 | $2O_1$ | 0 | $2O_1$ | 0 |
| ... | ... | ... | ... | ... |
| $(N_1 - 1) - 1$ | $(N_1 - 1) O_1$ | 0 | $(N_1 - 1) O_1$ | 0 |
| ... | 0 | $O_2$ | | |
| ... | $O_1$ | $O_2$ | | |
| ... | $2O_1$ | $O_2$ | | |
| ... | ... | ... | | |
| ... | $(N_1 - 1)O_1$ | $O_2$ | | |
| ... | ... | ... | | |
| ... | 0 | $(N_2 - 1)O_2$ | | |
| ... | $O_1$ | $(N_2 - 1)O_2$ | | |
| ... | $2O_1$ | $(N_2 - 1)O_2$ | | |
| ... | ... | ... | | |
| $N_1N_2 - 2$ | $(N_1 - 1)O_1$ | $(N_2 - 1)O_2$ | | |

Figure 4:
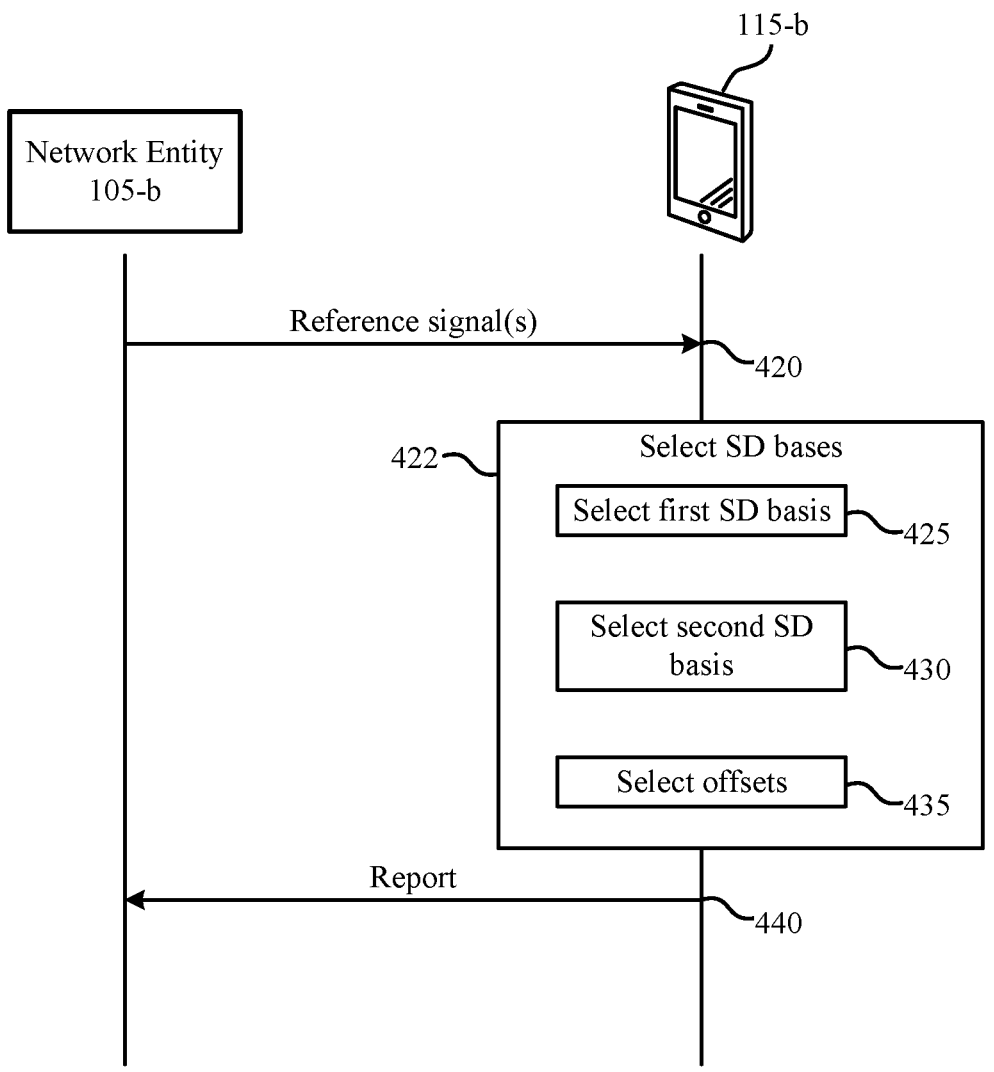
FIG. 4 shows an example of a process flow that supports SD basis selection from an extended orthogonal set in accordance with one or more examples as disclosed herein.

FIG. 4 shows an example of a process flow 400 that supports SD basis selection from an extended orthogonal set in accordance with one or more examples as disclosed herein. The process flow 400 may implement various aspects of the present disclosure described herein. The elements described in the process flow 400 (e.g., UE 115-b and network entity 105-b) may be examples of similarly named elements described herein.

In the following description of the process flow 400, the operations between the various entities or elements may be performed in different orders or at different times. Some operations may also be left out of the process flow 400, or other operations may be added. Although the various entities or elements are shown performing the operations of the process flow 400, some aspects of some operations may also be performed by other entities or elements of the process flow 400 or by entities or elements that are not depicted in the process flow, or any combination thereof.

At 420, the UE 115-b may receive one or more reference signals associated with one or more reference signal measurements.

At 422, the UE 115-b may select, from among a set of SD bases and based on the one or more reference signal measurements, a group (e.g., pair) of SD bases. For example, at 425, the UE 115-b may select, from among the set of SD bases and based on the one or more reference signal measurements, a first SD basis associated with a first communication layer. In some examples, the first SD basis is selected from within an SD basis selection space that includes the set of SD bases. And at 430, the UE 115-b may select, from among a subset of the set of SD bases and based on the one or more reference signal measurements, a second SD basis associated with a second communication layer and the subset of the set of SD bases may include a first group of one or more SD bases and a second group of one or more SD bases and each SD basis of the first group of one or more SD bases is orthogonal to the first SD basis in one dimension of the SD basis selection space, and wherein each SD basis of the second group of one or more SD bases is orthogonal to the first SD basis in two dimensions of the SD basis selection space.

Though illustrated separately at 425 and 430 respectively in the example of FIG. 4, it is to be understood that in some examples the first SD basis and the second SD basis may be selected as part of a single selection process (e.g., selection operation). For example, a UE 115 (e.g., an SD basis selection component therein) may evaluate groups (e.g., pairs) of SD bases for joint selection, but where membership of the groups may be such that, relative to a first SD basis included in the group, the other SD bases that are eligible for inclusion as a second SD basis within the group are in accordance with (e.g., are those other SD bases that satisfy) the eligibility criteria described herein for selecting a second SD basis. For example, relative to a first SD basis included in a group under evaluation for potential selection, SD bases that are eligible to be a second SD basis within the same group may be (i) those SD bases that are orthogonal to the first SD basis in two dimensions of the SD basis selection space as well as (ii) those SD bases that have zero offset (e.g., oversampling offset) relative to the first SD basis in one of the two dimensions but are orthogonal to the first SD basis in the other one of the two dimensions.

In some examples, the SD basis selection space is a two-dimensional selection space with a first dimension associated with a first quantity of antenna ports and a second dimension associated with a second quantity of antenna ports. In some examples, the second SD basis is selected from within the SD basis selection space.

In some examples, the set of SD bases may include a plurality of SD bases determined based on an oversampling of the two-dimensional selection space.

In some examples, each SD basis of the first group of one or more SD bases may have zero offset, relative to the first SD basis, within one dimension of the SD basis selection space. In some examples, each SD basis of the second group of one or more SD bases may have a first respective offset, relative to the first SD basis, within a first dimension of the SD basis selection space and a second respective offset, relative to the first SD basis, within a second dimension of the SD basis selection space, the first respective offset and the second respective offset based on respective integer multiples of an oversampling factor.

In some examples, the subset from among which the second SD basis is selected excludes the first SD basis.

In some examples, the first SD basis and the second SD basis are selected based on a comparison between a plurality of SD basis combinations, and each SD basis combination of the plurality of SD basis combinations may include a respective first candidate SD basis selected from among the set of SD bases and a respective second candidate SD basis selected from among a respective subset of the set of SD bases, the respective subset including a respective first group of one or more SD bases that are orthogonal to the respective first candidate SD basis in one dimension of the SD basis selection space and a respective second group of one or more SD bases that are orthogonal to the respective first candidate SD basis in two dimensions of the SD basis selection space.

In some examples, the second SD basis corresponds to an index associated with a first selection space offset and a second selection space offset that are relative to the first SD basis. In some examples, the first selection space offset, the second selection space offset, or both, are based on a first dimension of the SD basis selection space, a second dimension of the SD basis selection space, a first oversampling factor associated with the first dimension, a second oversampling factor associated with the second dimension, or any combination thereof.

In some examples, selecting the second SD basis from among the subset of the set of SD bases is based on satisfaction of a selection condition that is based on a rank criteria and a port quantity threshold. In some examples, the rank criteria may include a rank of two, three, or four and the port quantity threshold is greater than or equal to thirty-two (32).

In some examples, each SD basis within the set of SD bases corresponds to a respective beam for wireless communications.

In some examples, at 435 (e.g., as part of the SD bases selection at 422), the UE 115-b may select the first selection space offset and the second selection space offset from a first set of candidate selection space offsets or a second set of candidate selection space offsets based on a first value of the first dimension of the SD basis selection space, a second value of the second dimension of the SD basis selection space, or both and the second set of candidate selection space offsets is a subset of the first set of candidate selection space offsets.

At 440, the UE 115-b may transmit a report indicative of the first SD basis and the second SD basis. In some examples, the report indicates may indicate the index.

Figure 5:
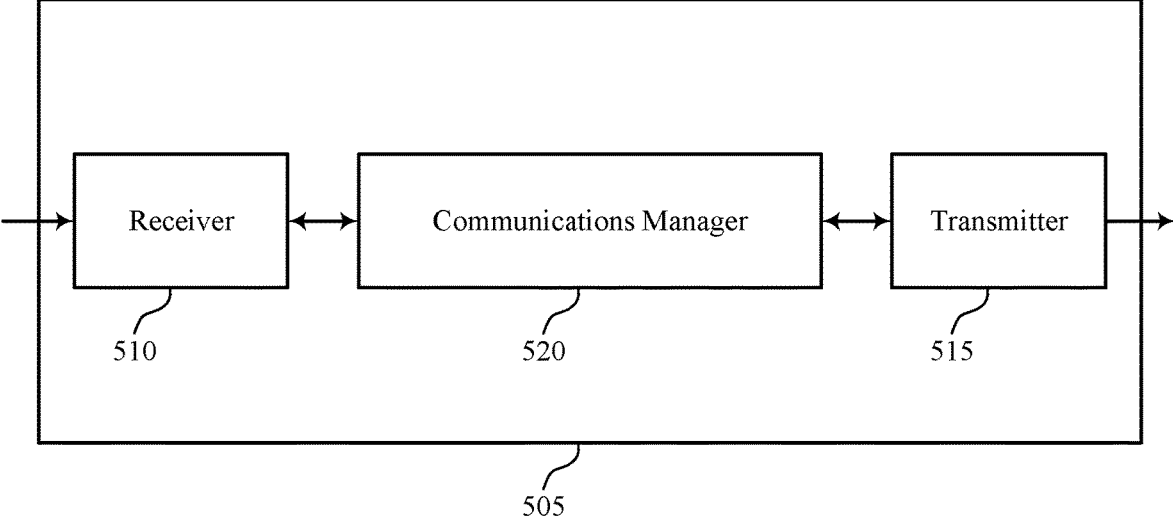
FIGS. 5 and 6 show block diagrams of devices that support SD basis selection from an extended orthogonal set in accordance with one or more examples as disclosed herein.

FIG. 5 shows a block diagram 500 of a device 505 that supports SD basis selection from an extended orthogonal set in accordance with one or more examples as disclosed herein. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to SD basis selection from an extended orthogonal set). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to SD basis selection from an extended orthogonal set). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of SD basis selection from an extended orthogonal set as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

Additionally, or alternatively, the communications manager 520 may support wireless communications in accordance with examples as disclosed herein. For example, the communications manager 520 is capable of, configured to, or operable to support a means for receiving one or more reference signals associated with one or more reference signal measurements. The communications manager 520 is capable of, configured to, or operable to support a means for selecting, from among a set of SD bases and based on the one or more reference signal measurements, a first SD basis associated with a first communication layer. The communications manager 520 is capable of, configured to, or operable to support a means for selecting, from among a subset of the set of SD bases and based on the one or more reference signal measurements, a second SD basis associated with a second communication layer, where the subset of the set of SD bases includes a first group of one or more SD bases and a second group of one or more SD bases, where each SD basis of the first group of one or more SD bases is orthogonal to the first SD basis in one dimension of a SD basis selection space, and where each SD basis of the second group of one or more SD bases is orthogonal to the first SD basis in two dimensions of the SD basis selection space. The communications manager 520 is capable of, configured to, or operable to support a means for transmitting a report indicative of the first SD basis and the second SD basis.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing, reduced power consumption, more efficient utilization of communication resources, or any combination thereof.

Figure 6:
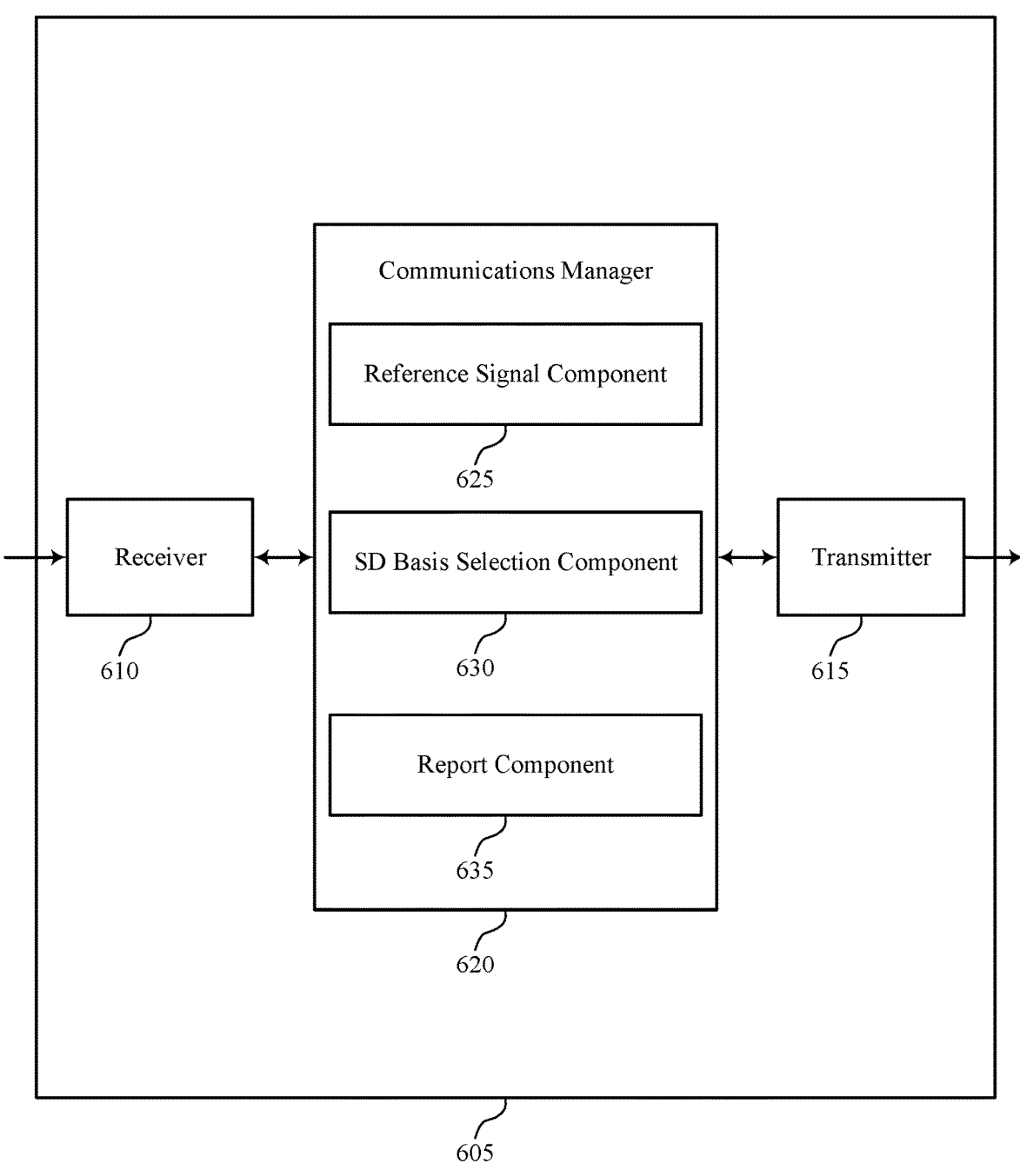

FIG. 6 shows a block diagram 600 of a device 605 that supports SD basis selection from an extended orthogonal set in accordance with one or more examples as disclosed herein. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to SD basis selection from an extended orthogonal set). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to SD basis selection from an extended orthogonal set). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of SD basis selection from an extended orthogonal set as described herein. For example, the communications manager 620 may include a reference signal component 625, a SD basis selection component 630, a report component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The reference signal component 625 is capable of, configured to, or operable to support a means for receiving one or more reference signals associated with one or more reference signal measurements. The SD basis selection component 630 is capable of, configured to, or operable to support a means for selecting, from among a set of SD bases and based on the one or more reference signal measurements, a first SD basis associated with a first communication layer. The SD basis selection component 630 is also capable of, configured to, or operable to support a means for selecting, from among a subset of the set of SD bases and based on the one or more reference signal measurements, a second SD basis associated with a second communication layer, where the subset of the set of SD bases includes a first group of one or more SD bases and a second group of one or more SD bases, where each SD basis of the first group of one or more SD bases is orthogonal to the first SD basis in one dimension of a SD basis selection space, and where each SD basis of the second group of one or more SD bases is orthogonal to the first SD basis in two dimensions of the SD basis selection space. The report component 635 is capable of, configured to, or operable to support a means for transmitting a report indicative of the first SD basis and the second SD basis.

Figure 7:
FIG. 7 shows a block diagram of a communications manager that supports SD basis selection from an extended orthogonal set in accordance with one or more examples as disclosed herein.

FIG. 7 shows a block diagram 700 of a communications manager 720 that supports SD basis selection from an extended orthogonal set in accordance with one or more examples as disclosed herein. The communications manager 720 may be an example of aspects of a communications manager 520, a communications manager 620, or both, as described herein. The communications manager 720, or various components thereof, may be an example of means for performing various aspects of SD basis selection from an extended orthogonal set as described herein. For example, the communications manager 720 may include a reference signal component 725, an SD basis selection component 730, a beam component 735, a report component 735, an offset component 740, or any combination thereof. Each of these components, or components or subcomponents thereof (e.g., one or more processors, one or more memories), may communicate, directly or indirectly, with one another (e.g., via one or more buses).

Additionally, or alternatively, the communications manager 720 may support wireless communications in accordance with examples as disclosed herein. The reference signal component 725 is capable of, configured to, or operable to support a means for receiving one or more reference signals associated with one or more reference signal measurements. The SD basis selection component 730 is capable of, configured to, or operable to support a means for selecting, from among a set of SD bases and based on the one or more reference signal measurements, a first SD basis associated with a first communication layer. The SD basis selection component 730 is also capable of, configured to, or operable to support a means for selecting, from among a subset of the set of SD bases and based on the one or more reference signal measurements, a second SD basis associated with a second communication layer, where the subset of the set of SD bases includes a first group of one or more SD bases and a second group of one or more SD bases, where each SD basis of the first group of one or more SD bases is orthogonal to the first SD basis in one dimension of a SD basis selection space, and where each SD basis of the second group of one or more SD bases is orthogonal to the first SD basis in two dimensions of the SD basis selection space. The report component 735 is capable of, configured to, or operable to support a means for transmitting a report indicative of the first SD basis and the second SD basis.

In some examples, the SD basis selection space is a two-dimensional selection space with a first dimension associated with a first quantity of antenna ports and a second dimension associated with a second quantity of antenna ports. In some examples, the first SD basis and the second SD basis are selected from within the SD basis selection space.

In some examples, the set of SD bases includes a set of multiple SD bases determined based on an oversampling of the two-dimensional selection space.

In some examples, each SD basis of the first group of one or more SD bases has zero offset, relative to the first SD basis, within one dimension of the SD basis selection space. In some examples, each SD basis of the second group of one or more SD bases has a first respective offset, relative to the first SD basis, within a first dimension of the SD basis selection space and a second respective offset, relative to the first SD basis, within a second dimension of the SD basis selection space, the first respective offset and the second respective offset based on respective integer multiples of an oversampling factor.

In some examples, the subset from among which the second SD basis is selected excludes the first SD basis.

In some examples, the first SD basis and the second SD basis are selected based on a comparison between a set of multiple SD basis combinations, where each SD basis combination of the set of multiple SD basis combinations includes a respective first candidate SD basis selected from among the set of SD bases and a respective second candidate SD basis selected from among a respective subset of the set of SD bases, the respective subset including a respective first group of one or more SD bases that are orthogonal to the respective first candidate SD basis in one dimension of the SD basis selection space and a respective second group of one or more SD bases that are orthogonal to the respective first candidate SD basis in two dimensions of the SD basis selection space.

In some examples, the second SD basis corresponds to an index associated with a first selection space offset and a second selection space offset that are relative to the first SD basis. In some examples, the first selection space offset, the second selection space offset, or both, are based on a first dimension of the SD basis selection space, a second dimension of the SD basis selection space, a first oversampling factor associated with the first dimension, a second oversampling factor associated with the second dimension, or any combination thereof.

In some examples, the offset component 740 is capable of, configured to, or operable to support a means for selecting the first selection space offset and the second selection space offset from a first set of candidate selection space offsets or a second set of candidate selection space offsets based on a first value of the first dimension of the SD basis selection space, a second value of the second dimension of the SD basis selection space, or both, where the second set of candidate selection space offsets is a subset of the first set of candidate selection space offsets.

In some examples, the report indicates the index.

In some examples, selecting the second SD basis from among the subset of the set of SD bases is based on satisfaction of a selection condition that is based on a rank criteria and a port quantity threshold.

In some examples, the rank criteria includes a rank of two, three, or four. In some examples, the port quantity threshold is greater than or equal to thirty-two (32).

In some examples, each SD basis within the set of SD bases corresponds to a respective beam for wireless communications.

Figure 8:
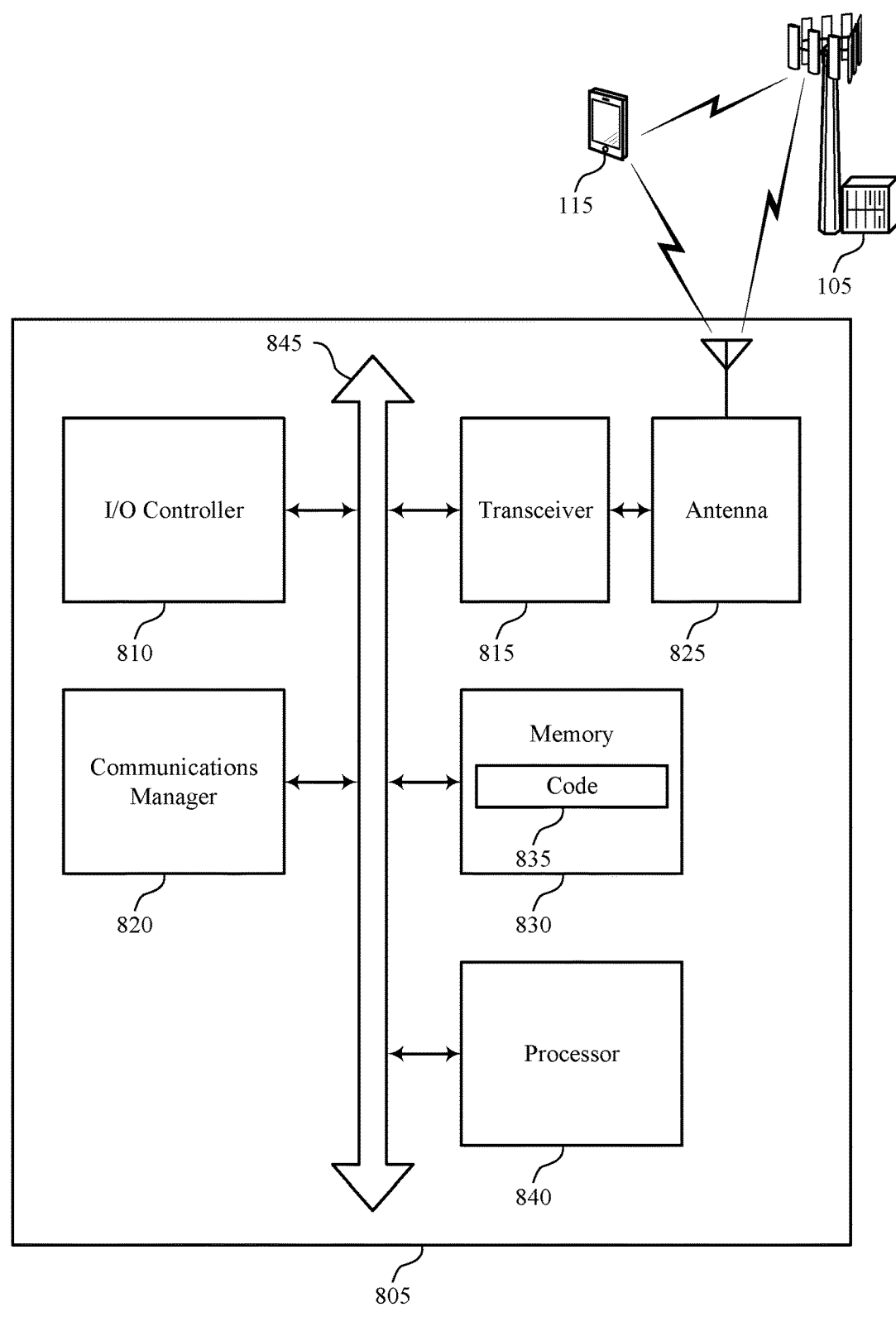
FIG. 8 shows a diagram of a system including a device that supports SD basis selection from an extended orthogonal set in accordance with one or more examples as disclosed herein.

FIG. 8 shows a diagram of a system 800 including a device 805 that supports SD basis selection from an extended orthogonal set in accordance with one or more examples as disclosed herein. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting SD basis selection from an extended orthogonal set). For example, the device 805 or a component of the device 805 may include at least one processor 840 and at least one memory 830 coupled with or to the at least one processor 840, the at least one processor 840 and the at least one memory 830 configured to perform various functions described herein.

In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs.

The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

Additionally, or alternatively, the communications manager 820 may support wireless communications in accordance with examples as disclosed herein. For example, the communications manager 820 is capable of, configured to, or operable to support a means for receiving one or more reference signals associated with one or more reference signal measurements. The communications manager 820 is capable of, configured to, or operable to support a means for selecting, from among a set of SD bases and based on the one or more reference signal measurements, a first SD basis associated with a first communication layer. The communications manager 820 is capable of, configured to, or operable to support a means for selecting, from among a subset of the set of SD bases and based on the one or more reference signal measurements, a second SD basis associated with a second communication layer, where the subset of the set of SD bases includes a first group of one or more SD bases and a second group of one or more SD bases, where each SD basis of the first group of one or more SD bases is orthogonal to the first SD basis in one dimension of a SD basis selection space, and where each SD basis of the second group of one or more SD bases is orthogonal to the first SD basis in two dimensions of the SD basis selection space. The communications manager 820 is capable of, configured to, or operable to support a means for transmitting a report indicative of the first SD basis and the second SD basis.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 820 may be configured to perform various operations (e.g., receiving, monitoring, transmitting) using or otherwise in cooperation with the transceiver 815, the one or more antennas 825, or any combination thereof. For example, the communications manager 820 may be configured to receive or transmit messages or other signaling as described herein via the transceiver 815. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of SD basis selection from an extended orthogonal set as described herein, or the at least one processor 840 and the at least one memory 830 may be otherwise configured to, individually or collectively, perform or support such operations.

FIG. 9 shows a flowchart illustrating a method 900 that supports SD basis selection from an extended orthogonal set in accordance with one or more examples as disclosed herein. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving one or more reference signals associated with one or more reference signal measurements. The operations of 905 may be performed in accordance with examples as disclosed herein. In some examples, aspects of the operations of 905 may be performed by a reference signal component 725 as described with reference to FIG. 7. Additionally or alternatively, means for performing 905 may, but not necessarily, include, for example, antenna 825, transceiver 815, communications manager 820, memory 830 (including code 835), processor 840 and/or bus 845.

At 910, the method may include selecting, from among a set of SD bases and based on the one or more reference signal measurements, a first SD basis associated with a first communication layer. The operations of 910 may be performed in accordance with examples as disclosed herein. In some examples, aspects of the operations of 910 may be performed by an SD basis selection component 730 as described with reference to FIG. 7. Additionally or alternatively, means for performing 910 may, but not necessarily, include, for example, antenna 825, transceiver 815, communications manager 820, memory 830 (including code 835), processor 840 and/or bus 845.

At 915, the method may include selecting, from among a subset of the set of SD bases and based on the one or more reference signal measurements, a second SD basis associated with a second communication layer, where the subset of the set of SD bases includes a first group of one or more SD bases and a second group of one or more SD bases, where each SD basis of the first group of one or more SD bases is orthogonal to the first SD basis in one dimension of a SD basis selection space, and where each SD basis of the second group of one or more SD bases is orthogonal to the first SD basis in two dimensions of the SD basis selection space. The operations of 915 may be performed in accordance with examples as disclosed herein. In some examples, aspects of the operations of 915 may be performed by an SD basis selection component 730 as described with reference to FIG. 7. Additionally or alternatively, means for performing 915 may, but not necessarily, include, for example, antenna 825, transceiver 815, communications manager 820, memory 830 (including code 835), processor 840 and/or bus 845. Though illustrated separately in the example of FIG. 9, it is to be understood that in some examples the first SD basis and the second SD basis may be selected as part of a single selection process (e.g., selection operation). For example, a UE 115 (e.g., an SD basis selection component therein) may evaluate groups (e.g., pairs) of SD bases for joint selection, but where membership of the groups may be such that, relative to a first SD basis included in the group, the other SD bases that are eligible for inclusion as a second SD basis within the group are in accordance with (e.g., are those other SD bases that satisfy) the eligibility criteria described herein for selecting a second SD basis.

At 920, the method may include transmitting a report indicative of the first SD basis and the second SD basis. The operations of 920 may be performed in accordance with examples as disclosed herein. In some examples, aspects of the operations of 920 may be performed by a report component 735 as described with reference to FIG. 7. Additionally or alternatively, means for performing 920 may, but not necessarily, include, for example, antenna 825, transceiver 815, communications manager 820, memory 830 (including code 835), processor 840 and/or bus 845.

The following provides an overview of aspects of the present disclosure:

Aspect 1: A method for wireless communications at a UE, comprising: receiving one or more reference signals associated with one or more reference signal measurements; selecting, from among a set of SD bases and based at least in part on the one or more reference signal measurements, a first SD basis associated with a first communication layer; selecting, from among a subset of the set of SD bases and based at least in part on the one or more reference signal measurements, a second SD basis associated with a second communication layer, wherein the subset of the set of SD bases comprises a first group of one or more SD bases and a second group of one or more SD bases, wherein each SD basis of the first group of one or more SD bases is orthogonal to the first SD basis in one dimension of a SD basis selection space, and wherein each SD basis of the second group of one or more SD bases is orthogonal to the first SD basis in two dimensions of the SD basis selection space; and transmitting a report indicative of the first SD basis and the second SD basis.

Aspect 2: The method of aspect 1, wherein the SD basis selection space is a two-dimensional selection space with a first dimension associated with a first quantity of antenna ports and a second dimension associated with a second quantity of antenna ports; and the first SD basis and the second SD basis are selected from within the SD basis selection space.

Aspect 3: The method of aspect 2, wherein the set of SD bases comprises a plurality of SD bases determined based at least in part on an oversampling of the two-dimensional selection space.

Aspect 4: The method of any of aspects 1 through 3, wherein each SD basis of the first group of one or more SD bases has zero offset, relative to the first SD basis, within one dimension of the SD basis selection space; and each SD basis of the second group of one or more SD bases has a first respective offset, relative to the first SD basis, within a first dimension of the SD basis selection space and a second respective offset, relative to the first SD basis, within a second dimension of the SD basis selection space, the first respective offset and the second respective offset based at least in part on respective integer multiples of an oversampling factor.

Aspect 5: The method of any of aspects 1 through 4, wherein the subset from among which the second SD basis is selected excludes the first SD basis.

Aspect 6: The method of any of aspects 1 through 5, wherein the first SD basis and the second SD basis are selected based at least in part on a comparison between a plurality of SD basis combinations, wherein each SD basis combination of the plurality of SD basis combinations comprises a respective first candidate SD basis selected from among the set of SD bases and a respective second candidate SD basis selected from among a respective subset of the set of SD bases, the respective subset comprising a respective first group of one or more SD bases that are orthogonal to the respective first candidate SD basis in one dimension of the SD basis selection space and a respective second group of one or more SD bases that are orthogonal to the respective first candidate SD basis in two dimensions of the SD basis selection space.

Aspect 7: The method of any of aspects 1 through 6, wherein the second SD basis corresponds to an index associated with a first selection space offset and a second selection space offset that are relative to the first SD basis; and the first selection space offset, the second selection space offset, or both, are based at least in part on a first dimension of the SD basis selection space, a second dimension of the SD basis selection space, a first oversampling factor associated with the first dimension, a second oversampling factor associated with the second dimension, or any combination thereof.

Aspect 8: The method of aspect 7, further comprising: selecting the first selection space offset and the second selection space offset from a first set of candidate selection space offsets or a second set of candidate selection space offsets based at least in part on a first value of the first dimension of the SD basis selection space, a second value of the second dimension of the SD basis selection space, or both, wherein the second set of candidate selection space offsets is a subset of the first set of candidate selection space offsets.

Aspect 9: The method of any of aspects 7 through 8, wherein the report indicates the index.

Aspect 10: The method of any of aspects 1 through 9, wherein selecting the second SD basis from among the subset of the set of SD bases is based at least in part on satisfaction of a selection condition that is based at least in part on a rank criteria and a port quantity threshold.

Aspect 11: The method of aspect 10, wherein the rank criteria comprises a rank of two, three, or four; and the port quantity threshold is greater than or equal to thirty-two (32).

Aspect 12: The method of any of aspects 1 through 11, wherein each SD basis within the set of SD bases corresponds to a respective beam for wireless communications.

Aspect 13: A UE for wireless communications, comprising one or more memories storing processor-executable code, a transceiver, and one or more processors coupled with the one or more memories and the transceiver, the one or more processors individually or collectively operable to execute the code to cause the UE to perform a method of any of aspects 1 through 12.

Aspect 14: A UE for wireless communications, comprising at least one means for performing a method of any of aspects 1 through 12.

Aspect 15: A non-transitory computer-readable medium storing code for wireless communications, the code comprising instructions executable by one or more processors to perform a method of any of aspects 1 through 12.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   one or more memories storing processor-executable code;
   a transceiver; and
   one or more processors coupled with the one or more memories and the transceiver, the one or more processors individually or collectively operable to execute the code to cause the UE to:
   receive, via the transceiver, one or more reference signals associated with one or more reference signal measurements;
   select, from among a set of spatial domain bases and based at least in part on the one or more reference signal measurements, a first spatial domain basis associated with a first communication layer;
   select, from among a subset of the set of spatial domain bases and based at least in part on the one or more reference signal measurements, a second spatial domain basis associated with a second communication layer, wherein the subset of the set of spatial domain bases comprises a first group of one or more spatial domain bases and a second group of one or more spatial domain bases, wherein each spatial domain basis of the first group of one or more spatial domain bases is orthogonal to the first spatial domain basis in one dimension of a spatial domain basis selection space, and wherein each spatial domain basis of the second group of one or more spatial domain bases is orthogonal to the first spatial domain basis in two dimensions of the spatial domain basis selection space; and
   transmit, via the transceiver, a report indicative of the first spatial domain basis and the second spatial domain basis.

2. The UE of claim 1, wherein:
   the spatial domain basis selection space is a two-dimensional selection space with a first dimension associated with a first quantity of antenna ports and a second dimension associated with a second quantity of antenna ports; and the first spatial domain basis and the second spatial domain basis are selected from within the spatial domain basis selection space.

3. The UE of claim 2, wherein the set of spatial domain bases comprises a plurality of spatial domain bases determined based at least in part on an oversampling of the two-dimensional selection space.

4. The UE of claim 1, wherein:

each spatial domain basis of the first group of one or more spatial domain bases has zero offset, relative to the first spatial domain basis, within one dimension of the spatial domain basis selection space; and each spatial domain basis of the second group of one or more spatial domain bases has a first respective offset, relative to the first spatial domain basis, within a first dimension of the spatial domain basis selection space and a second respective offset, relative to the first spatial domain basis, within a second dimension of the spatial domain basis selection space, the first respective offset and the second respective offset based at least in part on respective integer multiples of an oversampling factor.

5. The UE of claim 1, wherein the subset from among which the second spatial domain basis is selected excludes the first spatial domain basis.

6. The UE of claim 1, wherein the first spatial domain basis and the second spatial domain basis are selected based at least in part on a comparison between a plurality of spatial domain basis combinations, wherein each spatial domain basis combination of the plurality of spatial domain basis combinations comprises a respective first candidate spatial domain basis selected from among the set of spatial domain bases and a respective second candidate spatial domain basis selected from among a respective subset of the set of spatial domain bases, the respective subset comprising a respective first group of one or more spatial domain bases that are orthogonal to the respective first candidate spatial domain basis in one dimension of the spatial domain basis selection space and a respective second group of one or more spatial domain bases that are orthogonal to the respective first candidate spatial domain basis in two dimensions of the spatial domain basis selection space.

7. The UE of claim 1, wherein:

the second spatial domain basis corresponds to an index associated with a first selection space offset and a second selection space offset that are relative to the first spatial domain basis; and the first selection space offset, the second selection space offset, or both, are based at least in part on a first dimension of the spatial domain basis selection space, a second dimension of the spatial domain basis selection space, a first oversampling factor associated with the first dimension, a second oversampling factor associated with the second dimension, or any combination thereof.

8. The UE of claim 7, wherein the one or more processors are individually or collectively further operable to execute the code to cause the UE to:

select the first selection space offset and the second selection space offset from a first set of candidate selection space offsets or a second set of candidate selection space offsets based at least in part on a first value of the first dimension of the spatial domain basis selection space, a second value of the second dimension of the spatial domain basis selection space, or both, wherein the second set of candidate selection space offsets is a subset of the first set of candidate selection space offsets.

9. The UE of claim 7, wherein the report indicates the index.

10. The UE of claim 1, wherein the one or more processors are individually or collectively operable to execute the code to cause the UE to select the second spatial domain basis from among the subset of the set of spatial domain bases based at least in part on satisfaction of a selection condition that is based at least in part on a rank criteria and a port quantity threshold.

11. The UE of claim 10, wherein:

the rank criteria comprises a rank of two, three, or four; and the port quantity threshold is greater than or equal to thirty-two (32).

12. The UE of claim 1, wherein each spatial domain basis within the set of spatial domain bases corresponds to a respective beam for wireless communications.

13. A method for wireless communications at a user equipment (UE), comprising:

receiving one or more reference signals associated with one or more reference signal measurements;

selecting, from among a set of spatial domain bases and based at least in part on the one or more reference signal measurements, a first spatial domain basis associated with a first communication layer;

selecting, from among a subset of the set of spatial domain bases and based at least in part on the one or more reference signal measurements, a second spatial domain basis associated with a second communication layer, wherein the subset of the set of spatial domain bases comprises a first group of one or more spatial domain bases and a second group of one or more spatial domain bases, wherein each spatial domain basis of the first group of one or more spatial domain bases is orthogonal to the first spatial domain basis in one dimension of a spatial domain basis selection space, and wherein each spatial domain basis of the second group of one or more spatial domain bases is orthogonal to the first spatial domain basis in two dimensions of the spatial domain basis selection space; and transmitting a report indicative of the first spatial domain basis and the second spatial domain basis.

14. The method of claim 13, wherein:

the spatial domain basis selection space is a two-dimensional selection space with a first dimension associated with a first quantity of antenna ports and a second dimension associated with a second quantity of antenna ports; and the first spatial domain basis and the second spatial domain basis are selected from within the spatial domain basis selection space.

15. The method of claim 13, wherein:

each spatial domain basis of the first group of one or more spatial domain bases has zero offset, relative to the first spatial domain basis, within one dimension of the spatial domain basis selection space; and each spatial domain basis of the second group of one or more spatial domain bases has a first respective offset, relative to the first spatial domain basis, within a first dimension of the spatial domain basis selection space and a second respective offset, relative to the first spatial domain basis, within a second dimension of the spatial domain basis selection space, the first respective offset and the second respective offset based at least in part on respective integer multiples of an oversampling factor.

16. The method of claim 13, wherein the first spatial domain basis and the second spatial domain basis are selected based at least in part on a comparison between a plurality of spatial domain basis combinations, wherein each spatial domain basis combination of the plurality of spatial domain basis combinations comprises a respective first candidate spatial domain basis selected from among the set of spatial domain bases and a respective second candidate spatial domain basis selected from among a respective subset of the set of spatial domain bases, the respective subset comprising a respective first group of one or more spatial domain bases that are orthogonal to the respective first candidate spatial domain basis in one dimension of the spatial domain basis selection space and a respective second group of one or more spatial domain bases that are orthogonal to the respective first candidate spatial domain basis in two dimensions of the spatial domain basis selection space.

17. The method of claim 13, wherein:
the second spatial domain basis corresponds to an index associated with a first selection space offset and a second selection space offset that are relative to the first spatial domain basis; and
the first selection space offset, the second selection space offset, or both, are based at least in part on a first dimension of the spatial domain basis selection space, a second dimension of the spatial domain basis selection space, a first oversampling factor associated with the first dimension, a second oversampling factor associated with the second dimension, or any combination thereof.

18. The method of claim 17, further comprising:
selecting the first selection space offset and the second selection space offset from a first set of candidate selection space offsets or a second set of candidate selection space offsets based at least in part on a first value of the first dimension of the spatial domain basis selection space, a second value of the second dimension of the spatial domain basis selection space, or both, wherein the second set of candidate selection space offsets is a subset of the first set of candidate selection space offsets.

19. The method of claim 13, wherein selecting the second spatial domain basis from among the subset of the set of spatial domain bases is based at least in part on satisfaction of a selection condition that is based at least in part on a rank criteria and a port quantity threshold.

20. A non-transitory computer-readable medium storing code for wireless communications, the code comprising instructions executable by one or more processors to:
receive one or more reference signals associated with one or more reference signal measurements;
select, from among a set of spatial domain bases and based at least in part on the one or more reference signal measurements, a first spatial domain basis associated with a first communication layer;
select, from among a subset of the set of spatial domain bases and based at least in part on the one or more reference signal measurements, a second spatial domain basis associated with a second communication layer, wherein the subset of the set of spatial domain bases comprises a first group of one or more spatial domain bases and a second group of one or more spatial domain bases, wherein each spatial domain basis of the first group of one or more spatial domain bases is orthogonal to the first spatial domain basis in one dimension of a spatial domain basis selection space, and wherein each spatial domain basis of the second group of one or more spatial domain bases is orthogonal to the first spatial domain basis in two dimensions of the spatial domain basis selection space; and
transmit a report indicative of the first spatial domain basis and the second spatial domain basis.

* * * * *